United States Patent [19]
Raczkowski

[11] 4,061,149
[45] Dec. 6, 1977

[54] ASH TRAY WITH SMOKE EXHAUSTER

[76] Inventor: Mark Bogdan Raczkowski, 55C Bruan Place, Clifton, N.J. 07012

[21] Appl. No.: 721,174

[22] Filed: Sept. 7, 1976

[51] Int. Cl.² .................. A24D 1/12; A24F 13/16
[52] U.S. Cl. ........................ 131/231; 224/29 H; 15/313; 131/175
[58] Field of Search .............. 131/231, 174, 175; 224/29 H, 29 S; 15/313

[56] References Cited
U.S. PATENT DOCUMENTS

| | | | |
|---|---|---|---|
| 1,611,437 | 12/1926 | Hardesty | 224/29 H |
| 2,299,668 | 10/1942 | Webster | 131/231 X |
| 2,499,942 | 3/1950 | Boyce | 131/231 UX |
| 2,561,275 | 7/1951 | Hentschel | 15/313 X |

Primary Examiner—Stephen C. Pellegrino
Attorney, Agent, or Firm—Robert F. Dziurgot

[57] ABSTRACT

An ash tray unit with exhaust ducts fixed to a self exhausting device which removes cigarette or cigar smoke outside of a moving vehicle. The ash tray with smoke exhauster is ideal for automobiles, busses, airplanes, trains, ships and boats.

2 Claims, 7 Drawing Figures

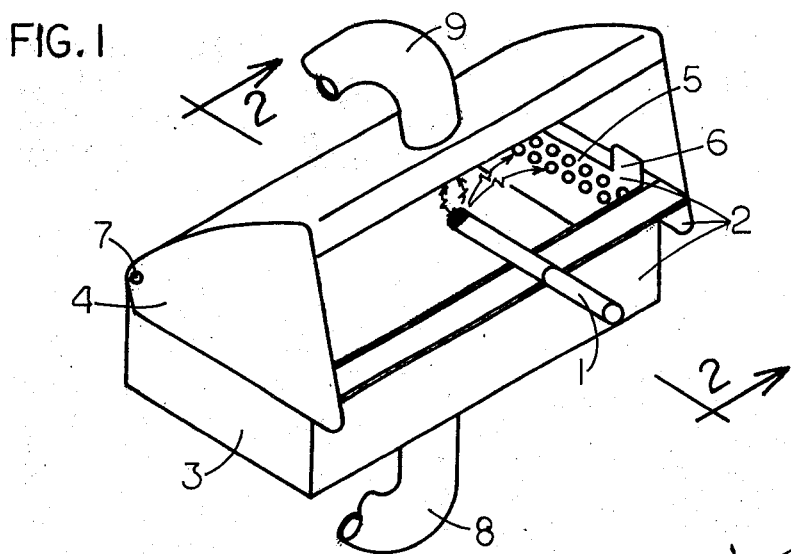
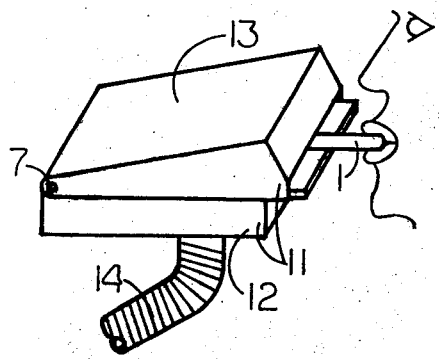
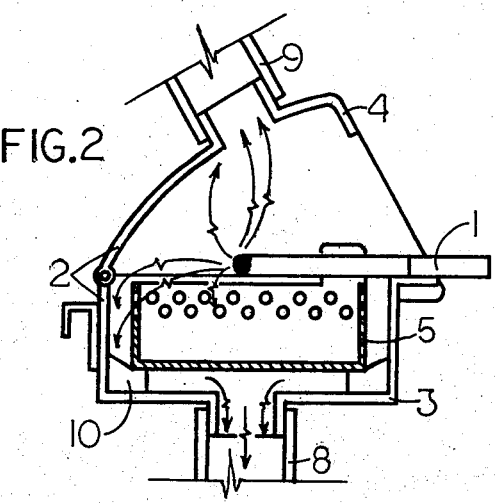
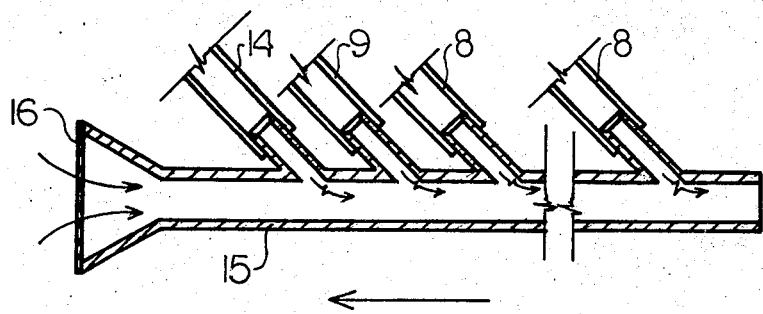

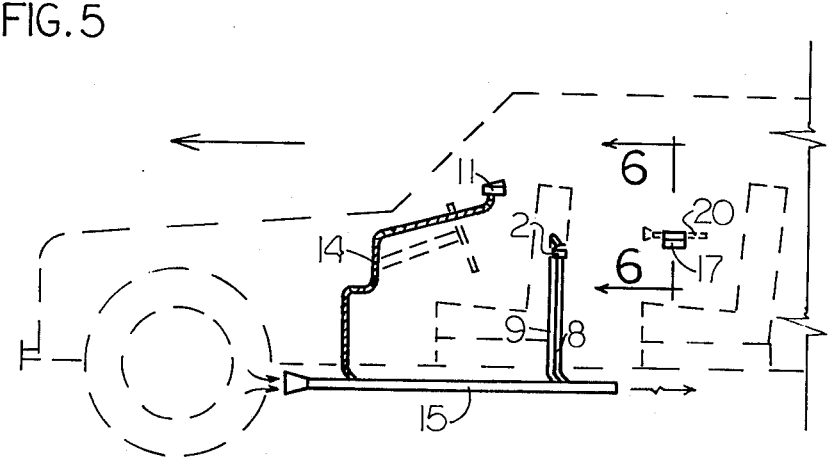
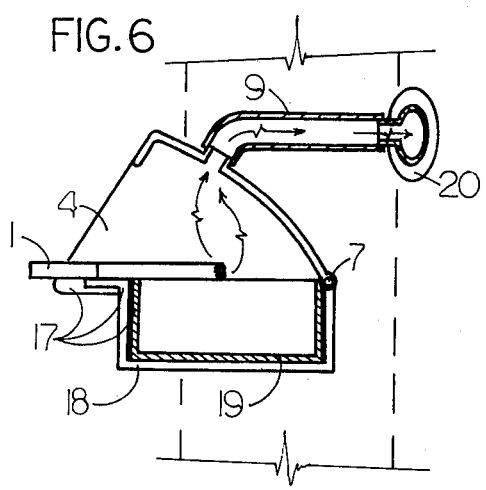
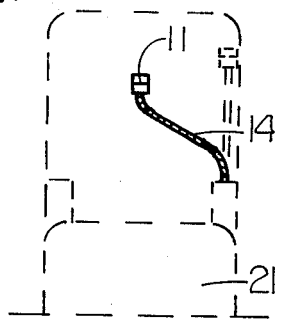

ASH TRAY WITH SMOKE EXHAUSTER

DESCRIPTION

Cigarette or cigar smoke contains over 300 toxic and cancerigenic compounds which are not only hazardous for smokers, but even more dangerous for non smokers whom comprise the majority of people (65% of U.S. population). Smoke fumes are most noxious and offensive in closed compartments such as automobiles, busses, airplanes, trains etc.

Therefore it is a principal object of this invention to provide an ash tray unit which draws and removes cigar or cigarette smoke out of a moving vehicle.

A further object of this invention is to provide an ash tray unit which also holds a smoking cigarette and thus freeing pilot's or driver's hands for steering purposes.

The ash tray of this invention is reliable and simple in design. Functioning of the ash tray with smoke exhauster will become understandable with the following description and drawings, in which:

FIG. 1 is a top perspective view of an open ash tray unit.

FIG. 2 is a sectional view of the open ash tray unit from FIG. 1 as seen along line 2 — 2.

FIG. 3 is a top perspective view of a closed ash tray unit.

FIG. 4 is a sectional view of a self exhauster with exhaust ducts.

FIG. 5 is a sectional view of an automobile with ash trays, ducts and self exhausters.

FIG. 6 is a sectional view of an open top ash tray from FIG. 5 as seen along line 6 — 6.

FIG. 7 is a front view of a passenger seat with the closed ash tray unit.

Referring now in greater detail to the drawings, for the purpose of illustrating the invention:

In FIG. 1 is seen a smoking cigarette 1 as placed on an open ash tray 2, which consists a housing 3, a hood 4, a pivot 7, a bottom exhaust duct 8 and a top exhaust duct 9. Inside of the housing 3 is a removable ash tray insert 5 with side openings and tabs 6.

In FIG. 2 are seen the parts from FIG. 1 and corner supports 10, which hold the ash tray insert 5 above the bottom of the housing 3. The cigarette smoke is drawn in by the top exhaust duct 9, and through side openings of the ash tray insert 5 and through space between the housing 3 and insert 5 by the bottom exhaust duct 8.

In FIG. 3 is seen the smoking cigarette 1 held in a closed ash tray 11, which consists a bottom housing 12, a cover 13, a pivot 7 and a flexible exhaust duct 14. The lower portion of this unit is similar to the ash tray from FIG. 1 & FIG. 2, thus containing the ash tray insert 5 and corner supports 10. Cigarette smoke is drawn out by the duct 14. The closed ash tray 12 holds a cigarette and frees pilot's or driver's hands for steering purposes.

In FIG. 4 is seen a self exhauster 15 having a funnel inlet and a stone shield screen 16. Top exhaust duct 9, bottom exhaust ducts 8 and a flexible exhaust duct 14 are mounted to inclined duct branches of the self exhauster 15. Bottom arrow shows the moving direction of a vehicle, arrows to the left show incoming air causing a suction effect in the exhaust ducts 8, 9 and 14.

In FIG. 5 is shown the open ash tray 2 with exhaust ducts 8 and 9, the closed ash tray 11 with flexible exhaust duct 14, an open top ash tray 17 with a small self exhauster 20 and the self exhauster 15, all installed in an automobile. The left bottom arrows show incoming air causing the suction for the exhaust ducts. The small self exhauster 20 works similarly to the self exhauster 15.

In FIG. 6 is seen a smoking cigarette 1 as placed on the open top ash tray 17 containing the hood 4, the top exhaust duct 9, the pivot 7, a closed housing 18 and an ash tray container 19. The small self exhauster 20 draws a cigarette smoke out while a vehicle is in motion.

In FIG. 7 are seen the closed ash tray 11 and the flexible exhaust duct 14 installed on a passenger or pilot seat 21. The flexible exhaust duct 14 must be connected to a self exhauster or to any vehicle ventilation system.

What is claimed is:

1. An ash tray unit, for installation on a vehicle, comprising:

a housing with an open top and having a bottom or side opening;

a hood means movably mounted on said housing and having an opening in an upper portion thereof;

an ash tray insert with an open top, mounted inside of said housing and having numerous side openings in the upper portion thereof;

corner support means between said housing and said ash tray insert for supporting said ashtray on said housing and providing space therebetween;

an self exhauster means with a funnel inlet, said self exhauster having an inlet opening having a stone shield screen mounted thereon, an outlet opening, and inclined duct branch means extending between said inlet and outlet openings;

a top exhaust duct between said hood opening and one said duct branches a bottom exhaust duct between said housing bottom or side openings and said another of said duct branches, whereby smoke from a cigarette in said ashtray is exhausted from said housing through said self exhauster means by air passing through said inlet opening when the vehicle is in motion.

2. In an ash tray unit as in claim 1 wherein said bottom exhaust duct is flexible.

* * * * *